US00RE35701E

United States Patent [19]

Foley

[11] E Patent Number: Re. 35,701

[45] Reissued Date of Patent: Dec. 30, 1997

[54] QUADRUPOLE MASS SPECTROMETER

[75] Inventor: Paul V. Foley, North Attleboro, Mass.

[73] Assignee: MKS Instruments, Inc., Andover, Mass.

[21] Appl. No.: 623,942

[22] Filed: Mar. 29, 1996

Related U.S. Patent Documents

Reissue of:

[64] Patent No.: 5,302,827
Issued: Apr. 12, 1994
Appl. No.: 60,344
Filed: May 11, 1993

[51] Int. Cl.[6] ..... H01J 49/42; H01J 49/14

[52] U.S. Cl. ..... 250/292; 250/288; 250/427

[58] Field of Search ..... 250/292, 288, 250/427

[56] References Cited

U.S. PATENT DOCUMENTS

| | | | |
|---|---|---|---|
| Re. 30,171 | 12/1979 | Kruger et al. | 250/423 R |
| 3,105,899 | 10/1963 | Gunther et al. | 250/292 |
| 3,553,452 | 1/1971 | Tiernan et al. | 250/41.9 |
| 3,619,684 | 11/1971 | Andrew et al. | 313/63 |
| 3,643,123 | 2/1972 | Haeff | 313/162 |
| 3,648,046 | 3/1972 | Denison et al. | 250/41.9 DS |
| 3,665,182 | 5/1972 | Goff et al. | 250/49.5 PI |
| 3,681,600 | 8/1972 | Rigden et al. | 250/49.5 A |
| 3,711,706 | 1/1973 | Davis | 250/41.9 |
| 3,835,319 | 9/1974 | Roehrig et al. | 250/292 |
| 3,886,365 | 5/1975 | Kruger et al. | 250/423 |
| 3,933,047 | 1/1976 | Fowler | 73/421.5 R |
| 3,936,634 | 2/1976 | Fite | 250/281 |
| 3,952,197 | 4/1976 | Samson | 250/382 |
| 3,961,896 | 6/1976 | Dunn | 23/232 A |
| 3,974,380 | 8/1976 | Rettinghaus et al. | 250/288 |
| 3,992,632 | 11/1976 | Kruger et al. | 250/423 R |
| 4,037,108 | 7/1977 | Jordan et al. | 250/427 |
| 4,105,916 | 8/1978 | Siegel | 250/282 |
| 4,146,787 | 3/1979 | Fite | 250/305 |
| 4,147,431 | 4/1979 | Mann | 356/72 |
| 4,175,029 | 11/1979 | Kovalsky et al. | 204/298 |
| 4,270,091 | 5/1981 | Mann | 324/462 |
| 4,272,699 | 6/1981 | Faubel et al. | 313/360 |
| 4,313,911 | 2/1982 | Moran et al. | 422/159 |
| 4,377,745 | 3/1983 | Chang | 250/283 |
| 4,426,576 | 1/1984 | Hurst et al. | 250/283 |
| 4,476,392 | 10/1984 | Young | 250/423 R |
| 4,507,555 | 3/1985 | Chang | 250/281 |
| 4,535,236 | 8/1985 | Batey | 250/292 |
| 4,579,144 | 4/1986 | Lin et al. | 137/565 |
| 4,620,102 | 10/1986 | Watanabe et al. | 250/427 |
| 4,686,365 | 8/1987 | Meek et al. | 250/281 |
| 4,689,574 | 8/1987 | Lin et al. | 324/464 |
| 4,808,820 | 2/1989 | Blau | 250/427 |
| 4,810,878 | 3/1989 | Kobayashi | 250/288 |
| 4,847,493 | 7/1989 | Sodal et al. | 250/252.1 |
| 4,933,551 | 6/1990 | Bernius et al. | 250/288 |
| 4,960,991 | 10/1990 | Goodley et al. | 250/281 |
| 4,985,657 | 1/1991 | Campbell | 313/362.1 |
| 5,055,677 | 10/1991 | Amirav et al. | 250/282 |
| 5,142,143 | 8/1992 | Fite et al. | 250/288 |
| 5,160,840 | 11/1992 | Vestal | 250/287 |

FOREIGN PATENT DOCUMENTS

| | | |
|---|---|---|
| 0 156 473 | 10/1985 | European Pat. Off. . |
| 1 426 664 | 12/1965 | France . |

*Primary Examiner*—Jack I. Berman
*Attorney, Agent, or Firm*—Lappin & Kusmer LLP

[57] ABSTRACT

A quadrupole mass spectrometer includes means for measuring total ion current having an electron repeller cage disposed about an electron source filament. The electron repeller cage repels electrons emitted by the electron source filament, urging them away from both the repeller and the filament, while also attracting positive ions. When the positive ions contact the electron repeller cage, a current is induced that is measured at the electron repeller cage. The measured current represents total ion current transmitted through the spectrometer. Thus, the need to include a total pressure measurement plate to measure total ion current is eliminated, and since the ion-exposed surface area of the electron repeller cage is greater than the ion-exposed surface area of the total pressure measurement plate, the invention provides improved total pressure measurement sensitivity.

34 Claims, 6 Drawing Sheets

QUADRUPOLE MASS SPECTROMETER

Matter enclosed in heavy brackets [ ] appears in the original patent but forms no part of this reissue specification; matter printed in italics indicates the additions made by reissue.

FIELD OF THE INVENTION

This invention relates generally to mass spectrometers, and more particularly to quadrupole mass spectrometers.

BACKGROUND OF THE INVENTION

Quadrupole mass spectrometers are known. A portion of a prior art quadrupole mass spectrometer is shown in FIG. 1 of the drawings. A ground plate 10 supports an electron source filament 12 via two conductive posts 14. The electron source filament 12 carries a current of sufficient magnitude so that electrons having a negative charge are emitted by the electron source filament 12, i.e., the electron source filament 12 serves as a cathode. The electrons are accelerated electrostatically towards an ion source cage 16 by an electric field in the region between an electron repeller cage 18 and the ion source cage 16. Positive ions are produced inside the ion source cage 16 when the accelerated electrons strike neutral gas particles, in the form of atoms and molecules or a mixture thereof, within the cage along the path of the electrons. The positive ions within the ion source cage 16 are accelerated towards a quadrupole mass filter 20 by a focus plate 30. The quadrupole mass filter 20 includes a quadrilaterally symmetric parallel array of four rods 22. Prior to entering the interior of the quadrupole mass filter 20, the positive ions pass through an aperture 24 of a total pressure measurement plate 26 described in greater detail below.

To obtain an indication of the mass spectrum of the ions in the space defined by the ion source cage 16, a constant (DC) and superimposed sinusoidally modulated (RF) voltage is applied to the rods 22 of the quadrupole mass filter 20, and are scanned in tandem such that their ratio remains constant. More specifically, each diametrically opposite pair of rods are connected together. A signal ($U+V\cos\omega t$), which includes a positive DC component (U) and a radio frequency (RF) component ($V\cos\omega t$), is applied to one pair of rods, while a signal ($-U-V\cos\omega t$), which includes a negative DC component ($-U$) and a radio frequency (RF) component ($-V\cos\omega t$) opposite in phase (180°) to the RF component of the first mentioned signal, is applied to other pair of rods. The DC and RF component signals are scanned such that their ratio of amplitudes, U/V, is kept constant. The fraction of the total ion current that exits the quadrupole mass filter 20 is partitioned according to the mass-to-charge ratio of each ion of the ion current. By scanning the RF voltage component from a low to a high value, a plurality of ions, each having a particular mass-to-charge ratio and arriving simultaneously at the entrance to the quadrupole mass filter 20, will arrive sequentially and ordered according to mass-to-charge ratio at the exit of the quadrupole mass filter 20. Generally, by scanning the RF voltage component from a low to a high value, ions having a relatively low mass-to-charge ratio will arrive at the end of the quadrupole mass filter 20 before ions having a relatively high mass-to-charge ratio. The ion current exiting the filter 20 is sensed by a detector (not shown), such as a Farraday cup.

In the prior art device described with respect to FIG. 1, the total pressure plate 26 is used to measure the total pressure of the gas within the device. Since the aperture 24 of the total pressure measurement plate 26 is smaller than the aperture 28 of the focus plate 30, a known fraction of the total ion current provided to the filter 20 is collected by the total pressure measurement plate 26. A current measurement device 29 connected to the pressure measurement plate 26 then provides a current signal as a function of the ion current collected by the total pressure measurement plate 26, and is therefore representative of the total ion current entering the quadrupole mass filter 20. Once the total ion current is known, the total pressure $P_T$ is obtained by multiplying the ion current by an empirically determined constant multiplicative factor. However, error can be introduced into this measurement of total pressure $P_T$ due to fringe field effects at the entrance of the quadrupole mass filter 20, such as "reflection" of ions back towards the plate 26 after they pass through the aperture 24. "Reflection" is a deflection of the original trajectory of the ions due to repulsive forces resulting from the fringe fields.

Accordingly, another known method of measuring total pressure $P_T$ has been developed that allows for the elimination of total pressure plate 26, thereby eliminating the problem created by the fringe field effect at the entrance of the quadrupole mass filter 20. In this prior art method, the DC voltage applied to the quadrupole mass filter 20 is set to 0 volts, and all of the ions that pass through the focus plate 30 will enter the quadrupole mass filter 20, and will be collected and measured at a detector (not shown in FIG. 1) as they exit the quadrupole mass filter 20. The ion current that is measured at the detector as the ions exit the quadrupole mass filter 20 represents the total ion current, from which can be calculated the total pressure $P_T$. However, in practice, inaccuracies can arise due to lighter ions, such as hydrogen and helium gas ions, failing to arrive at the detector (not shown) at the exit of the quadrupole mass filter 20. Consequently, the value obtained for total pressure $P_T$ is significantly inaccurate.

OBJECTS OF THE INVENTION

It is a general object of the present invention to provide a quadrupole mass spectrometer of the type described that significantly overcomes the problems of the prior art.

A more specific object of the present invention is to provide a quadrupole mass spectrometer having a simplified ion source.

Another object of the invention is to provide a quadrupole mass spectrometer that overcomes the problem of ion reflection at quadrupole fringe fields adversely affecting total pressure measurement.

Another object of the invention is to provide a quadrupole mass spectrometer that exhibits increased sensitivity of partial pressure measurements.

Another object of the invention is to provide a quadrupole mass spectrometer that exhibits significantly increased measured total ion current.

Another object of the invention is to provide a quadrupole mass spectrometer that maximizes the ion current transmitted through the quadrupole of the mass spectrometer.

Another object of the invention is to provide a quadrupole mass spectrometer that maximizes the stability of the measured total ion current.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

SUMMARY OF THE INVENTION

A quadrupole mass spectrometer is provided that includes means for measuring total ion current collected by an electron repeller cage disposed about an electron source filament. The electron repeller cage repels electrons emitted by the electron source filament, urging them away from both the repeller and the filament, while also attracting positive ions that induce a measurable current in the electron repeller cage upon contact therewith. The current measured at the electron repeller cage is proportional to the total ion current transmitted through the spectrometer. Thus, the need to include a total pressure measurement plate to measure total ion current is eliminated, without the disadvantages associated with setting the DC voltage in the rods of the quadrupole mass filter to zero. Additionally, since the ion-exposed surface area of the electron repeller cage is greater than the ion-exposed surface area of the typical prior art total pressure measurement plate, the invention provides improved total pressure measurement sensitivity. Further, by attracting ions created outside the ion source cage to the electron repeller, as opposed to using a part of the ion current applied to the quadrupole filter, the measurement of total pressure has little affect on the ion current applied to the filter.

As is generally known, the electron repeller cage assists the ion source cage in urging electrons emitted from the electron source filament into the ion source cage. See, for example, U.S. Pat. No. 4,579,144 (Kuo-Chin, el. al.) and U.S. Pat. No. 4,689,574 (Kuo-Chin, et al.). However, in accordance with the present invention, it has been appreciated that the emitted electrons strike neutrally charged gas particles, in the form of atoms and molecules or a mixture thereof, disposed both outside and within the ion source cage, yielding positive ions. By connecting the electron repeller at an appropriate potential, preferably system ground, the electron repeller can attract positive ions residing outside the ion source cage. Within the ion source cage, a focus electrode accelerates the positive ions disposed therein into a quadrupole mass filter, without passing through a total pressure measurement plate, because total pressure is obtained from the measurement of the current at the electron repeller cage.

BRIEF DESCRIPTION OF THE DRAWINGS

The invention will be more fully understood from the following detailed description, in conjunction with the accompanying figures, wherein.

DETAILED DESCRIPTION OF A PREFERRED EMBODIMENT

By way of further background, within the confines of a quadrupole mass spectrometer, the total pressure $P_T$ of a gas of neutral or ionized particles, where the particles can be either atoms, molecules, or a mixture thereof, consists of the sum of the partial pressures $P_N$ of each of the different constituents or trace elements of the gas. Stated mathematically, $$P_T=P_1+P_2+\ldots+P_N. \quad (1)$$

For example, a gas consisting essentially of diatomic hydrogen $H_2$ and helium He would have a total pressure equal to the sum of the partial pressure of diatomic hydrogen and the partial pressure of helium. Knowledge of total and partial pressures is useful for detecting leaks in a vacuum system, for example. For this and other reasons, it is highly desirable to measure both total and partial pressures as accurately and precisely as possible.

Both total and partial pressures are proportional to the corresponding volumetric number density. Thus, it follows that the total volumetric number density $N_T$, given as a number of atoms or molecules per cubic centimeter, for example, is equal to the sum of the partial volumetric number densities of the constituents or trace elements. Stated mathematically, $$N_T=N_1+N_2+\ldots N_N. \quad (2)$$

The probability of an electron colliding with a neutral atom or molecule, and thereby creating a positive ion is proportional to the volume number density of the neutral atom or molecule along the electron flight path. Thus, the current induced when positively ionized particles contact a surface instrumented with a current measurement device is proportional to the total volumetric number density of the neutral atoms or molecules, and therefore is proportional to the total pressure $P_T$ of the neutral atoms or molecules. Thus, knowledge of the total current due to ions contacting the surface instrumented with the current measurement device provides knowledge of the total pressure $P_T$.

Figure 1:
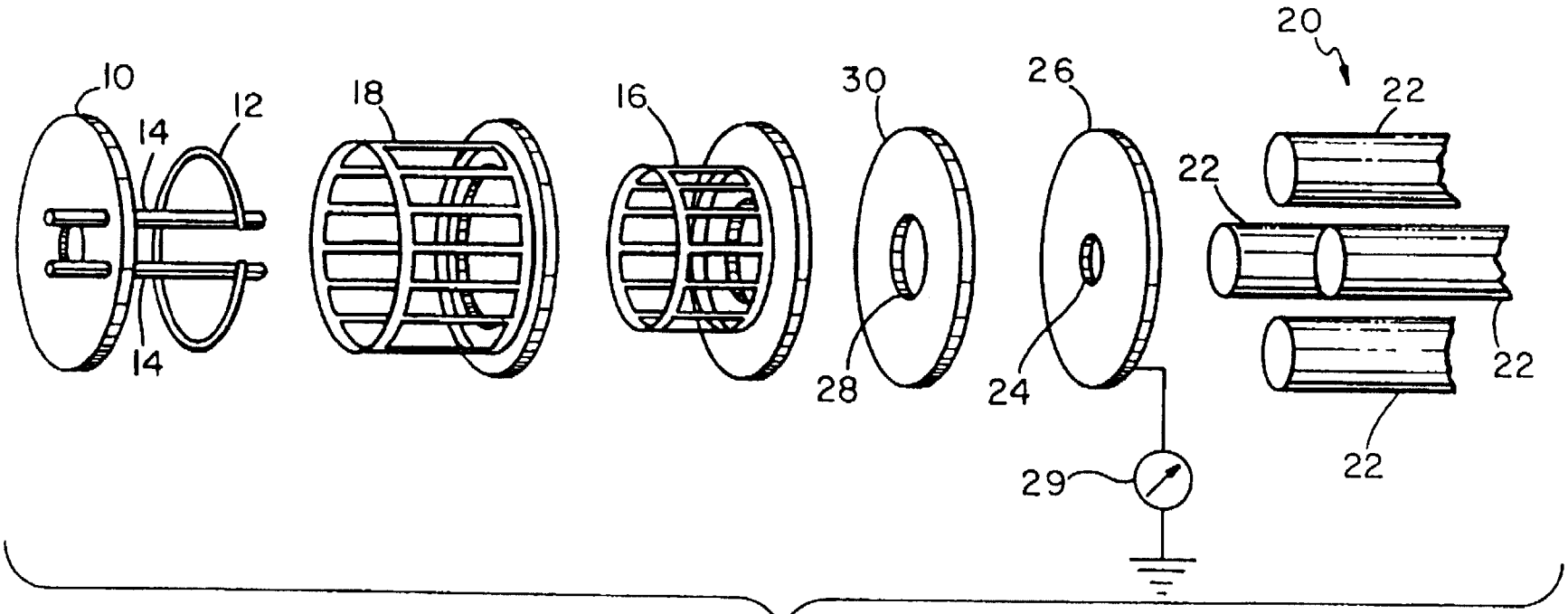
Fig. 1 PRIOR ART
FIG. 1 is an exploded perspective view of the ion source assembly, focus plate, and a portion of the quadrupole mass filter of a prior art quadrupole mass spectrometer, the ion source assembly having a total pressure measurement plate.
Figure 2:
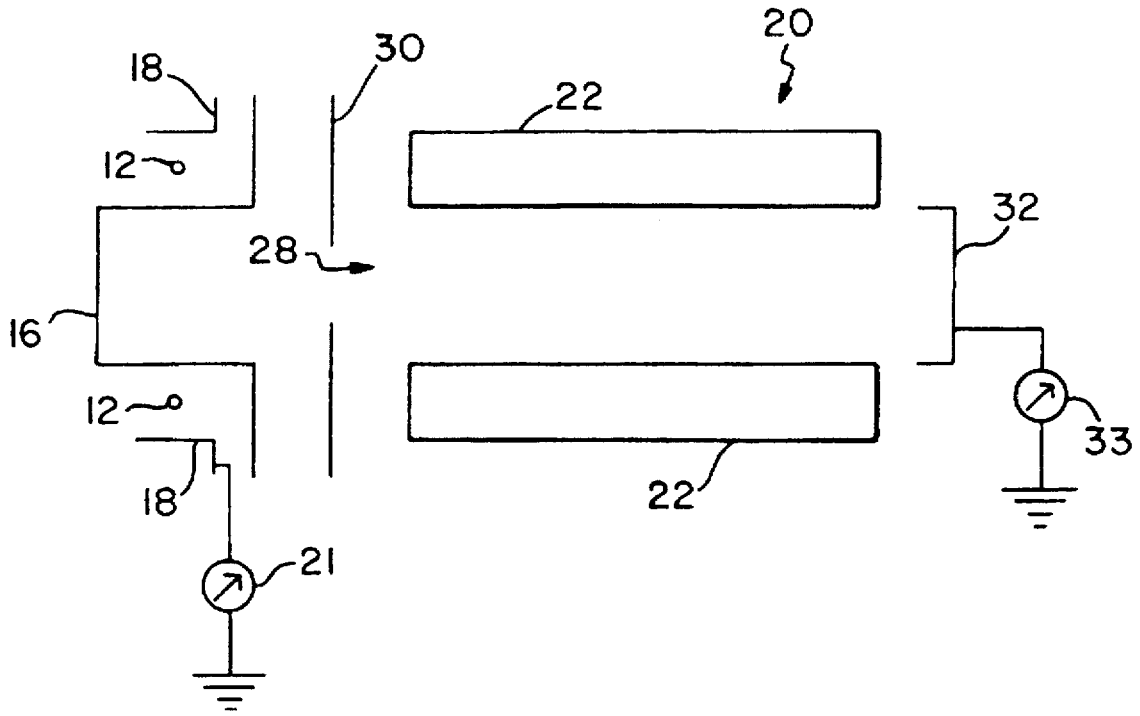
FIG. 2 is a schematic cut-away radial side view of the quadrupole mass spectrometer of the present invention.
Figure 3:
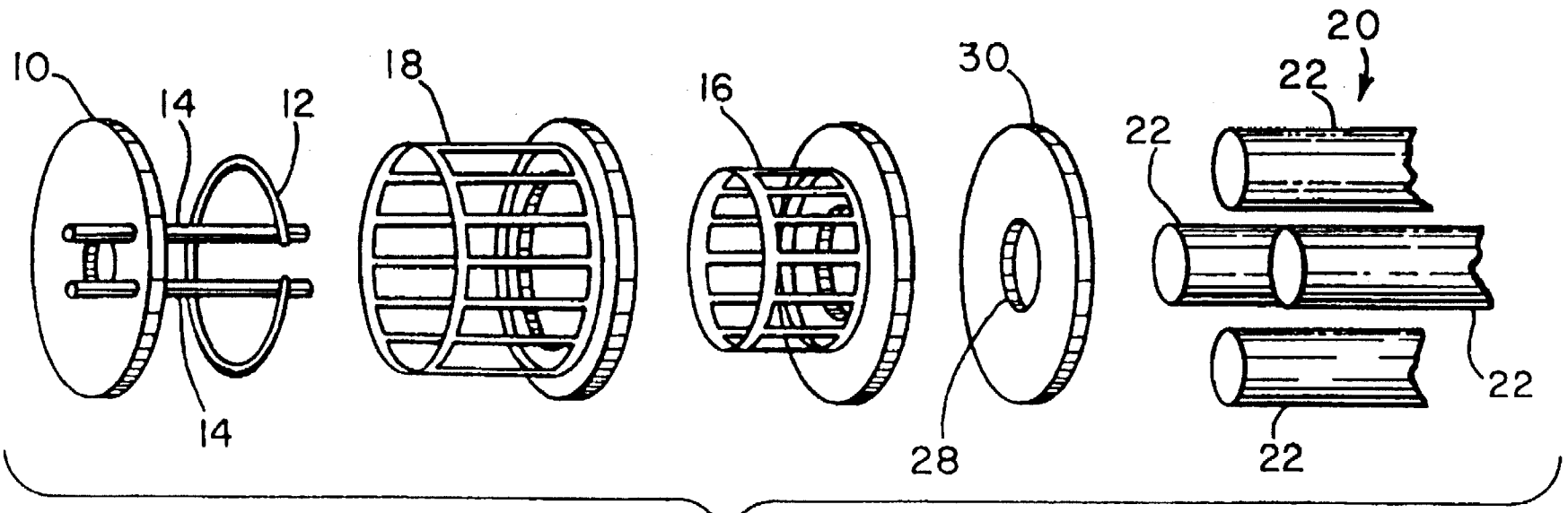
FIG. 3 is an exploded perspective view of the ion source assembly, focus plate, and a portion of the quadrupole mass filter of the quadrupole mass spectrometer of the present invention.
Figure 4:
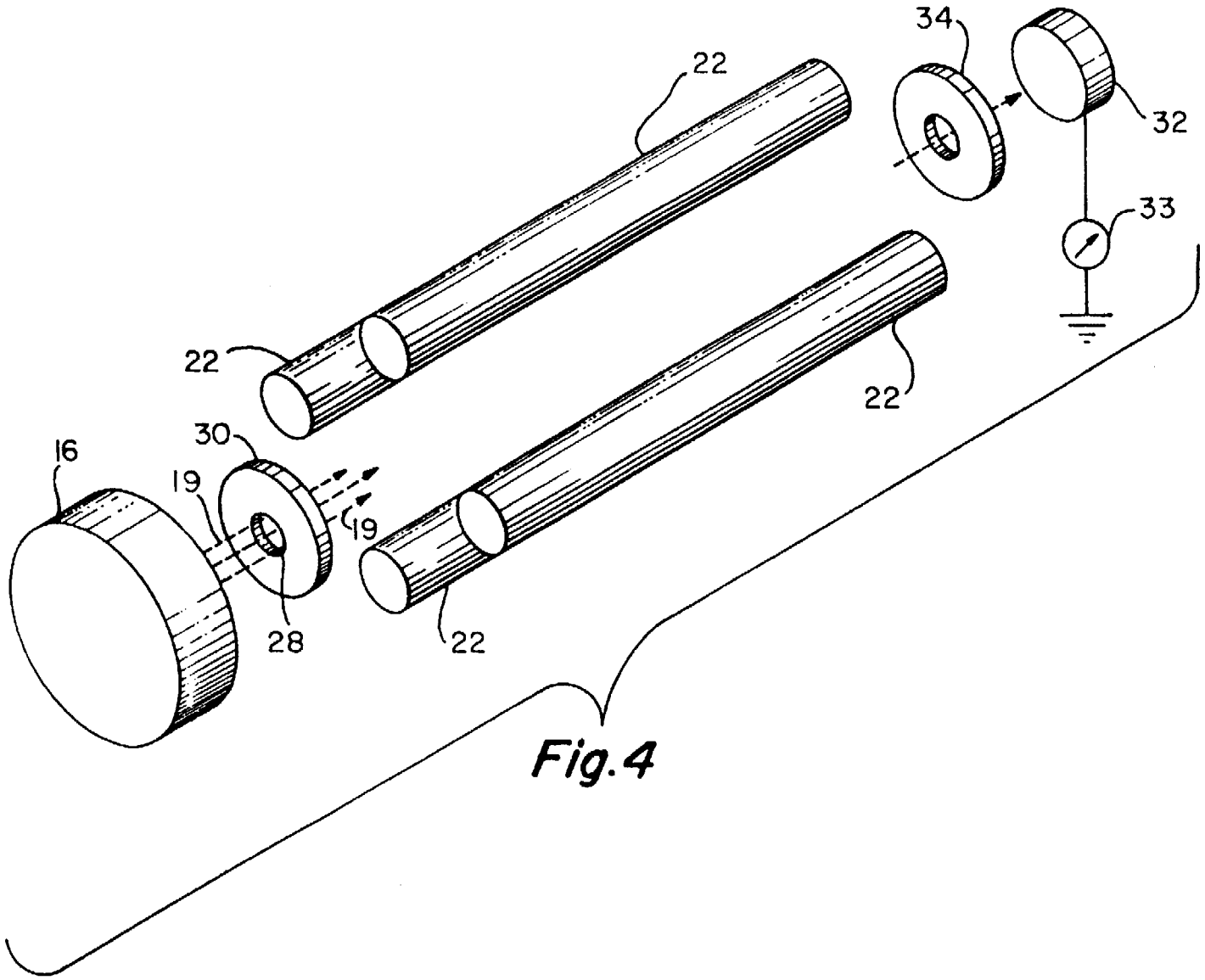
FIG. 4 is a schematic perspective view of the quadrupole mass spectrometer of the present invention, including an ion detector assembly.

Referring to FIGS. 2, 3, and 4, a current-carrying electron source filament 12 emits a plurality of electrons. An electron repeller cage 18 is biased at a lower voltage than the filament 12. For example, the electron repeller cage is biased at 0 volts by being electrically connected to a system ground of the mass spectrometer, and the filament is biased at +125 volts. Also, the ion source cage 16 is biased at a higher voltage than the filament, e.g., at +205 volts. Consequently, electrons emitted by the filament 12 are accelerated away from the electron repeller cage 18, while positive ions resulting from electron collisions with a neutral constituent or trace element are attracted towards the electron repeller cage 18. When the positive ions contact the electron repeller cage, a measurable current is induced therein, which current is measured by a current measurement device 21. The current measurement device 21 can measure currents in the range of $10^{-13}$ amps to $10^{-7}$ amps. The current measured by the device 21 is proportional to the total ion current.

The constant of proportionality that relates the measured current at the electron repeller cage and the total ion current is a function of gas species or constituent, and electron energy, and has a typical value of $3\times10^{-4}$ amps/torr, for example. This value is derived empirically. It must be calibrated at the factory, and then is preferably recalibrated periodically at a user site.

Preferably, a source cage 16 is disposed concentrically within the confines of both the electron source filament 12 and the electron repeller cage 18. Electrons emitted by the filament 12 that enter the volume embraced by the source cage 16 generate positive ions 19 therein. The positive ions 19 are drawn towards the quadrupole mass filter 20 by a focus plate 30 that is biased at +180 volts, for example. The positive ions 19 pass through an aperture 28 of the focus plate 30 and then enter the quadrupole mass filter 20, without being partially intercepted by a total pressure measurement plate, as in the prior art. Thus, unlike the prior art, substantially all of the ions 19 that traverse the focus plate 30 enter the quadrupole mass filter 20 for detection at a partial pressure detector 32 disposed at the distal end of the mass filter 20. Ion currents are measured at the detector by a current measurement device 33. To correct for fringe field effects at the distal end of the mass filter 20, a field correction plate 34 is preferably interposed between the partial pressure detector 32 and the mass filter 20.

RF and DC voltages applied to the quadrupole mass filter 20 are scanned to provide a so-termed mass spectrum, wherein ions characterized by a relatively high mass-to-charge ratio arrive at the detector 32 when the RF voltages are high, and ions characterized by a relatively low mass-to-charge ratio arrive at the detector 32 when the RF voltages are low. Since the applied RF voltage $V_{RF}$ is proportional to the mass of ions collected at the detector 32, the ion current measured by the measurement device 33 at the detector 32 is plotted as a function of the applied RF voltage to provide a mass spectrum of the ions 19 generated in the ion source cage 16.

In particular, the applied RF voltage $V_{RF}$ is equal to the product of the mass 'm' of a particular species or constituent in atomic mass units, the square of the frequency 'f' of the applied RF voltage in megahertz, the square of the inscribed radius $r_0$ (in centimeters) of the quadrupole mass filter 20, and the constant value 7.219. Stated mathematically, $$V_{RF}=7.219*m*r_0^2*f^2. \quad (3)$$

Figure 5A:
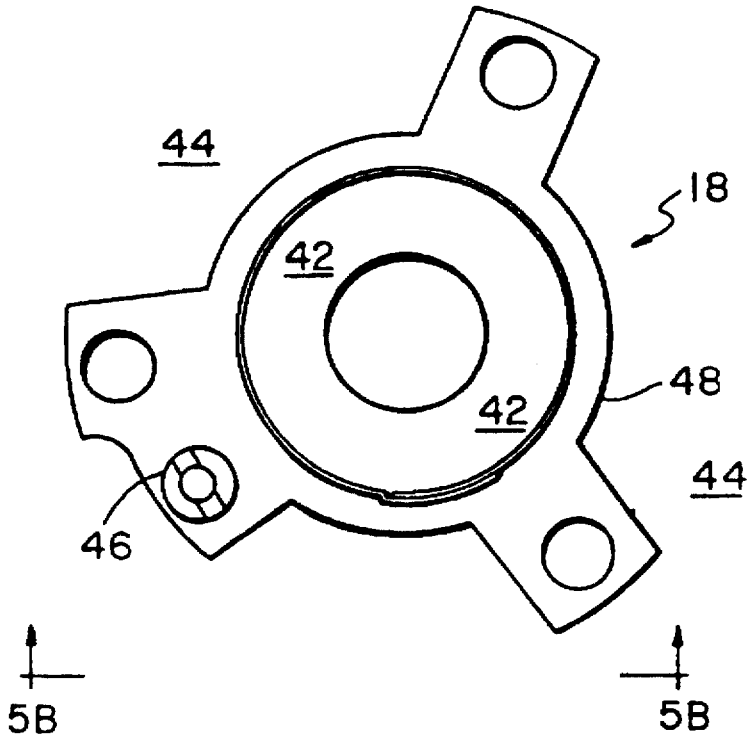
FIG. 5A is a top view of an embodiment of an electron repeller cage of the type used in the present invention, disposed on a mounting plate.
Figure 5B:
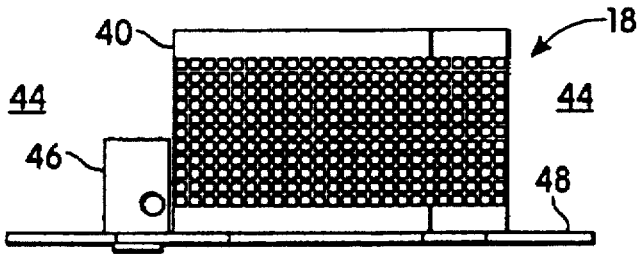
FIG. 5B is a side view of the embodiment of FIG. 5A.

Referring to FIGS. 5A and 5B, the electron repeller cage 18 includes a mesh region 40 having a property of both allowing high transit rate of neutral gas particles into its interior region 42, and supporting an electric field of a strength sufficient to repel electrons and attract positive ions. A preferred open area coefficient is about 60%, i.e., 60% of the surface area of the electron repeller cage 18 should permit free passage of neutral gas particles residing in a region 44 outside the cage 18 to the interior region 42 of the cage 18, although this area coefficient can vary. Electrical connection of a current measurement device is accomplished using a conductive post 46. The cage 18 is mounted upon and electrically coupled to an electron repeller support plate 48.

Figure 6:
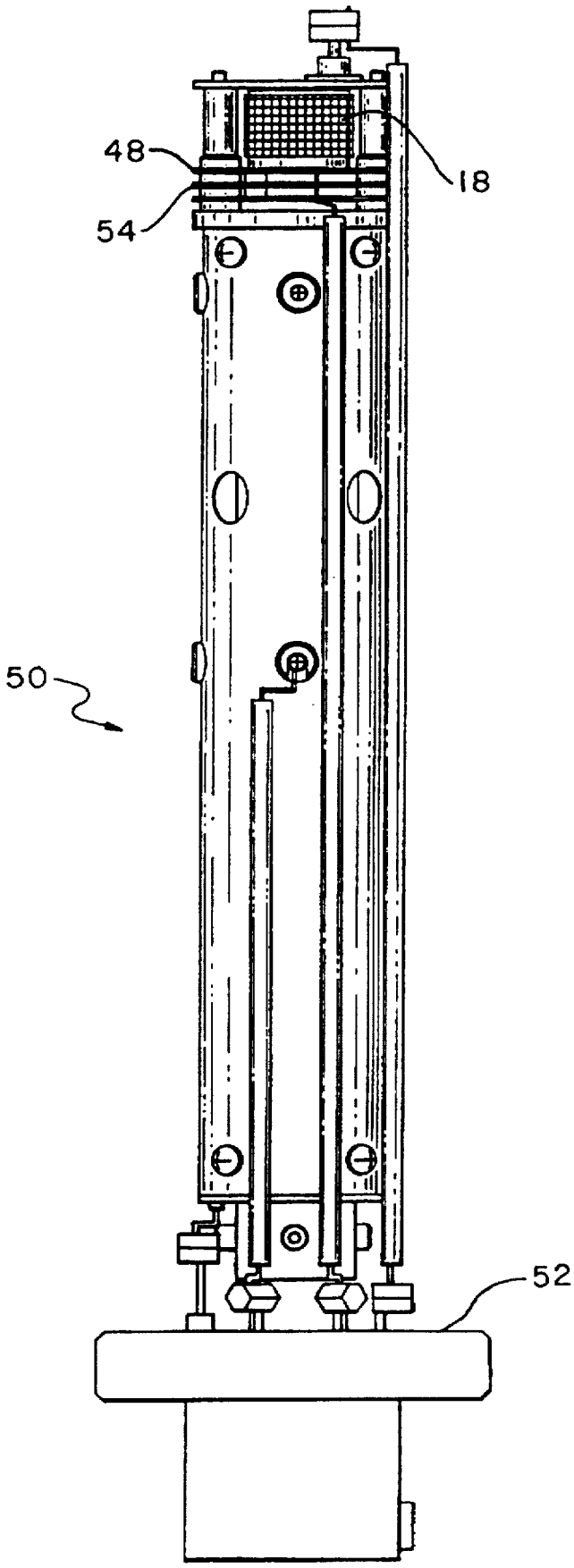
FIG. 6 is a pictorial representation of the quadrupole mass spectrometer of the present invention mounted upon a vacuum flange.

With reference to FIG. 6, the entire quadrupole mass spectrometer 50 is mounted upon a vacuum flange 52, and is thereby enclosed within a vacuum chamber capable of maintaining a vacuum of less than $10^{-4}$ torr, for example. The electron repeller cage 18 is to be recognized at the top of the figure. The ion source cage 16 (not shown in FIG. 6) is supported by an ion source cage support plate 54. The ion source cage 16 resides within, and is therefore mostly obscured by, the electron repeller cage 18 in this figure. Thus, the quadrupole mass spectrometer described in FIGS. 2–6 provides an improvement over the prior art.

Specifically, the quadrupole mass spectrometer of the invention includes a simplified ion source in that it does not require a total pressure measurement plate. Further, since a total pressure measurement plate is not used, the problem of ion reflection at quadrupole fringe fields is avoided. Moreover, due to the superior collection of ion current at the electron repeller cage sensitivity of total pressure measurements is increased, and the stability of the measured ion current is maximized. Additionally, since the invention does not depend upon a total pressure measurement plate, substantially all of the ions produced in the ion source cage enter the quadrupole mass filter, thereby providing a quadrupole mass spectrometer that exhibits significantly increased transmission through the quadrupole mass filter. This results in more sensitive measurements of partial pressures. Also, since the surface area of the electron repeller cage that is exposed to ions generated outside the ion source cage is significantly greater than the surface area of the pressure measurement plate that is exposed to ions generated inside the ion source cage, a larger total ion current signal is obtained by instrumenting the electron repeller cage for measuring total ion current, omitting the pressure measurement plate entirely. Further, the ion current provided to the mass quadrupole filter is derived from positive ions created in the ion source cage, while the total pressure current provided off of the electron repeller is derived from positive ions created outside the ion source cage. Thus, one will have no affect on the other. Additionally, since the method of measuring the total ion current does not involve the mass filter at all, problems in the prior art relating to the failure to trap light ions are entirely avoided.

Other modifications and implementations will occur to those skilled in the art without departing from the spirit and the scope of the invention as claimed. Accordingly, the above description is not intended to limit the invention except as indicated in the following claims.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A quadrupole mass spectrometer for measuring the relative amounts of the respective constituents of a gas present in said spectrometer, said spectrometer being of the type comprising a quadrupole mass filter, the quadrupole mass spectrometer comprising:

means for defining a space for containing a representative sample of said gas;

biased electron repeller means for repelling electrons and attracting positive ions contained within said space;

electron source means, disposed generally within said space, for emitting a plurality of electrons, the plurality of electrons being accelerated into said space so as to produce a plurality of positive ions, a fraction of the plurality of positive ions being attracted to the electron repeller means; and current measurement means, coupled to the electron repeller means, for measuring a current that results from the fraction of the plurality of positive ions that are attracted to the electron repeller means, and for providing a signal representative of the total ion current entering the quadrupole mass filter.

2. A quadrupole mass spectrometer according to claim 1, further including ion source means, disposed in said space, for providing a second fraction of the plurality of positive ions of said constituents of said gas and for generating the ion current entering said quadrupole mass filter.

3. A quadrupole mass spectrometer according to claim 2, wherein said ion source means comprises an ion source cage.

4. A quadrupole mass spectrometer according to claim 1, wherein said electron source means includes a filament.

5. A quadrupole mass spectrometer according to claim [1] 9, wherein electron source means for producing electrons comprises a filament disposed in said space.

6. A quadrupole mass spectrometer according to claim [1] 9, wherein said ion source means comprises a ion source cage.

7. A quadrupole mass spectrometer according to claim [1] 9, wherein said means for generating an ion current from the ions produced inside said ion source means so that said ion current represents the relative amounts of said constituents comprises a quadrupole mass filter.

8. A quadrupole mass spectrometer according to claim [1] 9, wherein said means for propelling said electrons produced by said electron source means through said space into said ion source means so that positive ions of each said constituent are produced in said space includes means for biasing said electron repeller means relative to said electron source means and said ion source means.

9. A quadrupole mass spectrometer for measuring the relative amounts of mass of one or more constituents, respectively of different molecular weights, of a gas, said spectrometer comprising:

(a) means for defining a space for containing a representative sample of said gas;

(b) electron source means for producing electrons;

(c) ion source means, disposed in said space, for producing ions of each of said constituents of said gas when particles of each constituent present in said ion source means are struck by electrons;

(d) means for propelling said electrons produced by said electron source means through said space into said ion source means so that positive ions of each said constituent are produced in said space, both inside and outside said ion source means, said means for propelling said electrons including electron repeller means for repelling said electrons toward said ion source means and for collecting ions received from said space; and (e) means for generating an ion current from the ions produced inside said ion source means so that said ion current represents the relative amounts of said constituents; and (f) means for generating a signal as a function of the ions collected by said electron repeller means and representative of the total ion current produced inside said ion source means.

10. In a quadrupole mass spectrometer comprising an electron source filament, the electron source filament carrying a current of sufficient magnitude such that electrons having a negative charge are emitted by the electron source filament, the electrons being accelerated towards an ion source cage by an electric field in the region between an electron repeller cage and the ion source cage, positive ions being produced both inside and outside the ion source cage when the accelerated electrons strike neutral gas particles along the path of the electrons, the positive ions within the ion source cage being accelerated towards a quadrupole mass filter by a focus plate, the quadrupole mass filter including a quadrilaterally symmetric parallel array of four charge-balanced rods, the improvement comprising:

current measurement means, coupled to the electron repeller cage for providing a signal representative of the total ion current entering the quadrupole mass filter.

*11. A mass spectrometer for measuring the relative amount of the respective constituents of a gas present in said spectrometer and including a gas analyzer, the mass spectrometer comprising:*

*means for defining a space such that a representative sample of a gas present in said spectrometer is present inside and outside of said space:*

*electron source means, disposed outside said space, for emitting a plurality of electrons, the plurality of electrons being accelerated towards said space so as to produce a plurality of positive ions;*

*means for generating a first ion current and a second ion current from said plurality of positive ions, said first ion current tending to travel in a first direction towards said gas analyzer, and said second ion current tending to travel in a second direction different from said first direction; and*

*current measurement means for measuring said second ion current.*

*12. A mass spectrometer according to claim 11, wherein said first direction is substantially perpendicular to said second direction.*

*13. A mass spectrometer according to claim 11, wherein said second ion current is representative of said first ion current.*

*14. A mass spectrometer according to claim 11, wherein said second ion current is representative of a pressure of said gas.*

*15. A mass spectrometer according to claim 11, wherein said gas analyzer comprises a quadrupole mass filter.*

*16. A mass spectrometer according to claim 11, wherein said means for defining a space comprises an ion source cage.*

*17. A mass spectrometer according to claim 11, wherein said means for defining a space comprises a closed ion source.*

*18. A mass spectrometer for measuring the relative amounts of mass of one or more constituents of a gas, said spectrometer comprising:*

*(a) means for defining a space such that a representative sample of a gas in the spectrometer is present inside and outside of said space;*

*(b) electron source means, disposed outside said space, for producing electrons;*

*(c) means for propelling said electrons produced by said electron source means into said space so that positive ions of each said constituent are produced both inside and outside said space;*

*(d) means for generating an ion current from the ions produced inside said space so that said ion current represents the relative amounts of said constituents inside said space;*

*(e) ion collector means for collecting ions generated outside said space; and*

*(f) means for generating a signal as a function of the ions collected by said ion collector means and representative of said ion current.*

*19. A mass spectrometer according to claim 18, wherein said means for defining a space comprises an ion source cage.*

*20. A mass spectrometer according to claim 18, wherein said means for defining a space comprises a closed ion source.*

*21. A mass spectrometer according to claim 18, wherein said signal is representative of a pressure of said gas.*

*22. A mass spectrometer according to claim 18, further comprising gas analyzer means for analyzing the ions generated inside said space.*

*23. A mass spectrometer according to claim 22, wherein said gas analyzer means comprises a quadrupole mass filter.*

*24. In a mass spectrometer comprising an electron source filament, the electron source filament carrying a current of sufficient magnitude such that electrons having a negative charge are emitted by the electron source filament, the electrons being accelerated towards a space by an electric field in the region between the electron source and the space, positive ions being produced both inside and outside the space when the accelerated electrons strike neutral gas particles along the path of the electrons, the improvement comprising:*

*ion collector means for attracting a fraction of said ions produced outside the space and for generating therefrom a signal representative of the number of ions produced inside the space.*

*25. In a mass spectrometer according to claim 24, wherein said signal is representative of a pressure of a gas in said space.*

*26. A quadrupole mass spectrometer for measuring the relative amounts of the respective constituents of a gas present in said spectrometer, said spectrometer being of the type comprising a quadrupole mass filter, the quadrupole mass spectrometer comprising:*

*means for defining a space for containing a representative sample of said gas;*

*biased electron repeller means for repelling electrons;*

*collecting means within said space for attracting and collecting positive ions contained within said space;*

*electron source means disposed generally within said space for emitting a plurality of electrons, the plurality of electrons being accelerated into said space so as to produce a plurality of positive ions a fraction of the plurality of positive ions being attracted to the collecting means; and*

*current measurement means, coupled to the collecting means, for measuring a current that results from the fraction of the plurality of positive ions that are collected by the collecting means, and for providing a signal representative of the total ion current exiting said space and entering the quadrupole mass filter.*

*27. A quadrupole mass spectrometer according to claim 26, further including ion source means, disposed in said space, for providing a second fraction of the plurality of positive ions of said constituents of said gas and for generating the ion current entering said quadrupole mass filter.*

*28. A quadrupole mass spectrometer according to claim 27, wherein said ion source means comprises and ion source cage.*

*29. A quadrupole mass spectrometer according to claim 26, wherein said electron source means includes a filament.*

*30. A quadrupole mass spectrometer for measuring the relative amounts of mass of one or more constituents, respectively, of a gas, said spectrometer comprising:*

*means for defining a space for containing a representative sample of said gas;*

*electron source means for producing electrons;*

*ion source means, disposed in said space, for producing ions of each of said constituents of said gas when particles of each constituent present in said ion source means are struck by electrons;*

*means for propelling said electrons produced by said electron source means through said space into said ion source means so that positive ions of each said constituent are produced in said space, both inside and outside said ion source means, said means for propelling said electrons including electron repeller means for repelling said electrons toward said ion source means;*

*collecting means for collecting ions received from said space and produced outside said ion source means;*

*means for generating an ion current from the ions produced inside said ion source means so that said ion current represents the relative amounts of said constituents; and*

*means for generating a signal as a function of the ions collected by said collecting means and representative of the total ion current produced inside said ion source means.*

*31. A quadrupole mass spectrometer according to claim 30, wherein the electron source means for producing electrons comprises a filament disposed in said space.*

*32. A quadrupole mass spectrometer according to claim 30, wherein said ion source means comprises an ion source cage.*

*33. A quadrupole mass spectrometer according to claim 30, wherein said means for generating an ion current from the ions produced inside said ion source means so that said ion current represents the relative amounts of said constituents comprises a quadrupole mass filter.*

*34. A quadrupole mass spectrometer according to claim 30, wherein said means for propelling said electrons produced by said electron source means through said space into said ion source means so that positive ions of each said constituent are produced in said space includes means for biasing said electron repeller means relative to said electron source means and said ion source means.*

* * * * *